United States Patent
Alfke

(10) Patent No.: US 8,352,526 B1
(45) Date of Patent: Jan. 8, 2013

(54) DIRECT DIGITAL SYNTHESIS WITH REDUCED JITTER

(75) Inventor: Peter H. Alfke, Los Altos Hills, CA (US)

(73) Assignee: Xilinx, Inc., San Jose, CA (US)

( * ) Notice: Subject to any disclaimer, the term of this patent is extended or adjusted under 35 U.S.C. 154(b) by 1504 days.

(21) Appl. No.: 11/454,357

(22) Filed: Jun. 16, 2006

(51) Int. Cl.
G06F 1/02 (2006.01)

(52) U.S. Cl. .................................. 708/271; 708/190

(58) Field of Classification Search .......... 708/270–277, 708/200, 190
See application file for complete search history.

(56) References Cited

U.S. PATENT DOCUMENTS

| | | | | |
|---|---|---|---|---|
| 4,410,954 A | * | 10/1983 | Wheatley, III | 708/101 |
| 4,412,339 A | * | 10/1983 | Alfke et al. | 708/290 |
| 6,279,158 B1 | * | 8/2001 | Geile et al. | 725/126 |
| 6,642,754 B1 | * | 11/2003 | Dobramysl et al. | 708/271 |
| 7,072,920 B2 | * | 7/2006 | Grushin | 708/103 |
| 7,103,622 B1 | * | 9/2006 | Tucholski | 708/276 |
| 7,268,594 B1 | * | 9/2007 | Alfke | 327/105 |
| 7,440,987 B1 | * | 10/2008 | Song et al. | 708/276 |
| 7,548,119 B2 | * | 6/2009 | Mitric et al. | 331/1 A |
| 2005/0083085 A1 | * | 4/2005 | Harron et al. | 327/105 |
| 2005/0091295 A1 | * | 4/2005 | Harron et al. | 708/271 |

OTHER PUBLICATIONS

Janusz Nieznanski, New Concept for Pulse Frequency Synthesis, 1997, IEEE Catalog No. 97TH8280, pp. 1112-1115.*
M J Underhill and M J Blewett, Spectral Improveme~T of Direct Digital Frequency Synthesisers and Other Frequency Sources, European Frequency Time Forum, Mar. 5-7, 1996 Conference Publication No. 418, IEEE 1996, pp. 452-460.*
CMOS DDS Modulator, AD7008 © Analog Devices, Inc., 1995, One Technology Way, P.O. Box 9106, Norwood. MA 02062-9106, U.S.A., Tel: 617/329-4700 Fax: 617/326-8703, pp. 1-16.*

* cited by examiner

Primary Examiner — Chat Do
Assistant Examiner — Kevin G Hughes
(74) Attorney, Agent, or Firm — Thomas A. Ward; John J. King

(57) ABSTRACT

A direct digital synthesis is provided with added circuitry to reduce jitter in an IC so that a programmable frequency output can be provided near the limits of the IC system clock with minimal jitter. The system derives the quotient Q as a remainder R in an accumulator at the instant of an overflow, divided by a programmable input N. The quotient Q is subjected to conversion logic that can be provided by a fast parallel to serial converter such as, for example a multi-gigabit transceiver (MGT) of an FPGA. As an alternative to an MGT, a series of delay devices such as found in a carry chain can be used if calibration is performed to assure the accuracy of delays.

18 Claims, 4 Drawing Sheets

| Register 303 Before Overflow | Register 303 After Overflow = R | R/N |
|---|---|---|
| (0)98 | (1)05 | 5/7 |
| (1)96 | (2)03 | 3/7 |
| (2)94 | (3)01 | 1/7 |
| (3)99 | (4)06 | 6/7 |
| (4)97 | (5)04 | 4/7 |
| (5)95 | (6)02 | 2/7 |
| (6)93 | (7)00 | 0 |
| (7)98 | (8)05 | 5/7 |
| Etc. | Etc. | Etc. |

DIRECT DIGITAL SYNTHESIS WITH REDUCED JITTER

BACKGROUND

1. Technical Field

The present invention relates to the use of Direct Digital Synthesis ("DDS") or "phase accumulation" to provide a clock source with reduced jitter.

2. Related Art

If it is necessary to generate a programmable output frequency with fine resolution and low jitter, for example as a clock source for a digital circuit, there is a natural conflict between programmability and stability, i.e. between frequency granularity and jitter. DDS or "phase accumulation" is the well-known traditional method to perform this function.

For DDS, an accumulator is clocked by the IC system clock, and overflow of the accumulator provides a digital pulse. The frequency of the pulse is related to the input to the accumulator. To program the frequency of overflow from the accumulator, a user selects the number added in the accumulator each clock cycle.

DDS can generate an average frequency with high resolution, limited only by the length of the accumulator, but jitter will be up to (plus or minus) one half clock period of the accumulator clock frequency. This means that jitter is >1 ns, with an accumulator operating at a high end IC system clock frequency of 500 MHz. For many practical applications, this jitter is unacceptable.

Traditional jitter reduction methods include use of a phase locked loop ("PLL") and well as digital signal manipulation. A phase locked loop is an analog device. A digital alternative is provided on the Spartan 3 and Virtex 4 series of Field Programmable Gate Arrays ("FPGA") manufactured by Xilinx Corporation of San Jose, Calif., which uses a digital clock manager in frequency lock mode. But this mode can introduce frequency wander with the concatenation of many slightly-too-long or slightly-too-short periods that can generate large frequency errors. This slowly changing frequency may not be desirable in communication applications.

It is, therefore, desirable to provide a jitter reduction method for an IC so that a programmable frequency output can be provided using minimal IC resources while producing minimal jitter and wander.

SUMMARY

In accordance with embodiments of the present invention, a circuit generating a programmable frequency output is provided that compensates for an output timing error of a DDS phase accumulator while using minimal resources. The circuit includes an accumulator with additional circuitry to calculate the quotient Q of a remainder R left in the accumulator at the moment of overflow, and the accumulator input value N, i.e., Q=R/N. For high-speed operation, inversion of the value N, or 1/N can be provided and then multiplied with R. Conversion logic circuitry then uses the quotient (R/N) to remove the jitter in the output signal, which is the overflow of the accumulator.

The conversion logic according to the present invention can include a Multi-Gigabit Transceiver ("MGT") of an FPGA, or discrete delay devices such as in a carry chain found in an FPGA. For an MGT, the quotient R/N is provided as a parallel input to define the desired delay increments created by the MGT from the time overflow of the accumulator occurs.

When an MGT or comparable transceiver device is not available, the carry chain can be used or other repetitive delay structure that likewise provides an incremental delay. Any variations of the repetitive delay structures due to temperature and voltage variations can be accounted for by continual calibration.

BRIEF DESCRIPTION OF THE DRAWINGS

Further details of the present invention are explained with the help of the attached drawings in which.

DETAILED DESCRIPTION

The accumulator circuitry and necessary logic for implementing embodiments of the present invention can be provided in a single FPGA. Although an FPGA is described as including such components, it is understood that either one or more other types of ICs can similarly include the components. Although other ICs can be used, for convenience, subsequent discussion of embodiments of the present invention will refer to components provided in an FPGA.

Figure 1:
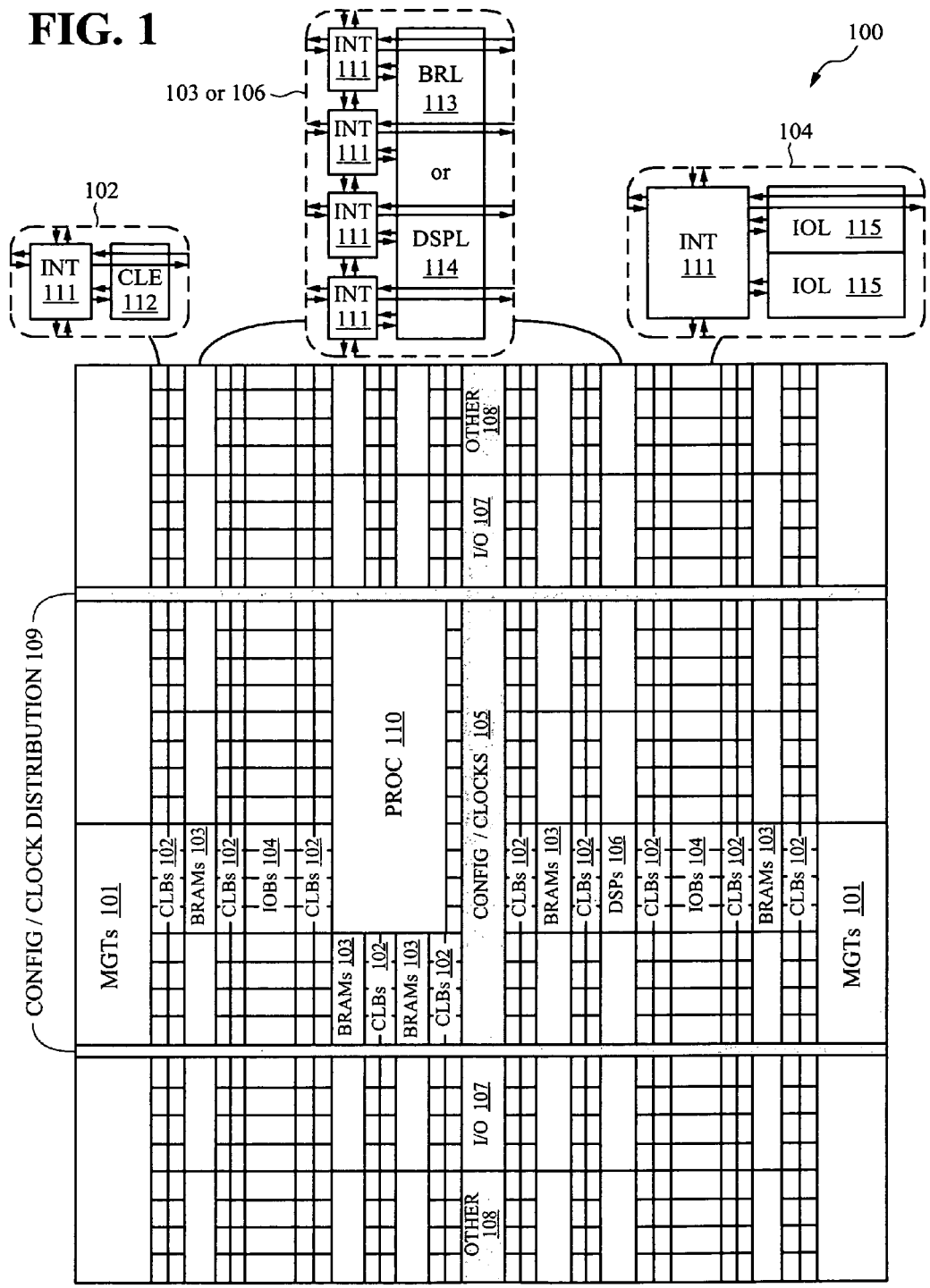
FIG. 1 illustrates one configuration of components in an FPGA.

For reference, FIG. 1 illustrates one configuration of components that can be included in an FPGA. The components include a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. The FPGA can also include a dedicated processor blocks (PROC 110).

Each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

Figure 2:
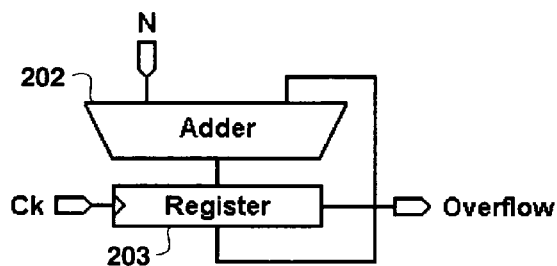
FIG. 2 shows a block diagram of components for an accumulator.

FIG. 2 shows a block diagram of components for an accumulator that can be used with embodiments of the present invention. The accumulator components are typical elements found in the DSP tiles of an FPGA, as well as in other types of ICs. The accumulator includes an adder 202 with an output provided to a register 203. The output of the register 203 is fed back to one input of the adder, while a second input of the adder 202 receives a binary input signal N. The register 203 is clocked by a clock signal Ck. The most significant bit of the accumulator register is used to indicate overflow. The accumulator functions by adding the user-supplied binary number N to the previous contents of the register 203 each clock cycle. The number of clock cycles required before overflow occurs depends on the number N elected and on the capacity (length) of the accumulator. A normal DDS frequency generator is formed using an accumulator with a programmable input N creating a desired frequency at the overflow output.

Figure 3:
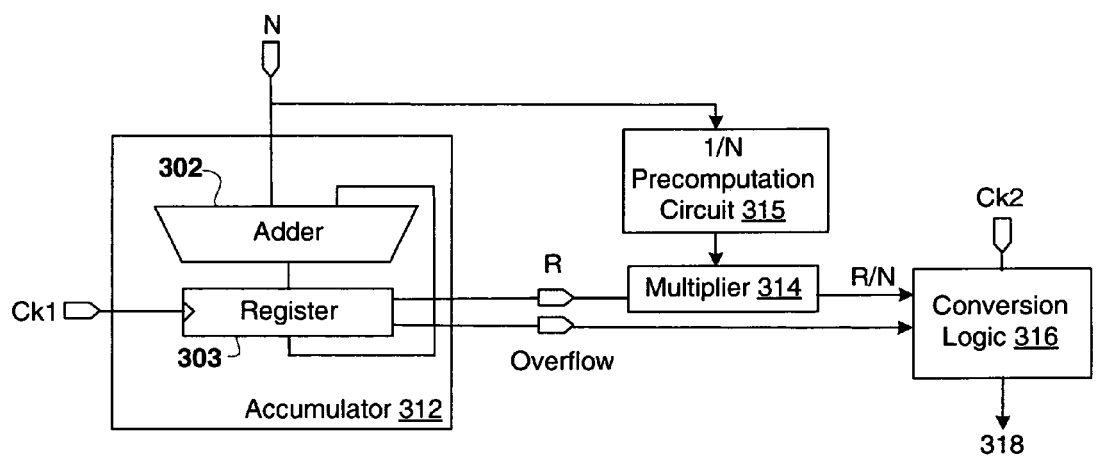
FIG. 3 shows a block diagram of components of a frequency generator according to embodiments of the present invention.

FIG. 3 discloses a system 300 according to embodiments of the present invention for reducing clock source jitter. In particular, FIG. 3 depicts a DDS frequency generator using an accumulator 312 with a programmable input N that can create a programmable output frequency using an overflow output. The accumulator circuit 312 in FIG. 3 includes an adder 302 and register 303 with a feedback path from the output of the register 303 to its own adder 302. The accumulator 312 functions by adding the digital input number N, which may be user-supplied, to the previous contents of the register 303, which is input to the adder 302, for each clock cycle. The register 303 is clocked by a clock signal Ck1. The number of clock cycles required before overflow occurs depends on the number N elected and the length of register 303. The most significant bit of the accumulator register 303 is used to indicate overflow. The remainder R is defined here as the remainder that is left in the accumulator 312 at the moment of overflow. The remainder R is provided to circuitry downstream for producing the quotient Q=R/N.

In one embodiment of the present invention, both the remainder R and number N are provided for performing division. Division logic, however, is slow and may be undesirable if N is a large number and Ck1 is near the highest clock frequency of the IC.

According to an alternative embodiment of the present invention, a multiplier 314 is used to compute the quotient of R/N for each clock cycle, as illustrated in FIG. 3. Fast multipliers can be used to form the multiplier 314 alleviating the problem of a slow divider. The value 1/N can be pre-computed in the relatively slower pre-computation circuit 315, since the N value generally is constant, and typically changes when the user so specifies. The pre-computation of 1/N favors rapid calculation of the quotient by obviating the need for time-consuming mathematical division in the calculation.

The quotient R/N is always a value ranging from 0 (inclusive) to 1 (exclusive). A zero quotient (i.e., R=0) means that there is no remainder R, and therefore no timing error, whereas a large quotient of R/N indicates that the output edge should have occurred much earlier.

Once R/N is computed, the quotient is subjected to conversion logic 316, which conversion logic 316 in turn might be driven by a second clock Ck2 that is preferably faster than Ck1. The conversion logic 316 has an output 318 that depends on R/N. The conversion logic 316 functions so that if R/N=0, then the output 318 of the conversion logic 316 will reflect that no timing error requires correction. However, if R/N≠0, then the output 318 will change as R changes (assuming as above, that N is a constant, pre-set value).

Figures 4, 5:
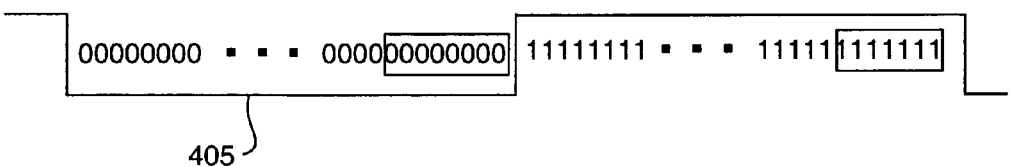
FIG. 4 provides a table illustrating how the quotient (R/N) varies and can be used to correct for jitter.
FIG. 5 illustrates how the faster clock Ck2, which drives the conversion logic 316, will also figure in determining the amount of adjustment to be made to compensate for the timing error.

FIG. 4 provides a table illustrating how the quotient (R/N) varies and can be used to correct for jitter. In the table, N is assumed to be 7, while the overflow of accumulator 312 is assumed to occur at 100. All values are in decimal with register capacity going from 0 to 99. The first overflow occurs when the register 303 reaches (1)05. Note the register 303 stored a number 98 prior to the overflow clock cycle where 7 more is added to create (1)05, giving a remainder of 5 at overflow. The first correction quotient (R/N) is, thus, 5/7. The second overflow occurs at (2)03, giving a quotient (R/N) of 3/7. Note that when R=0, R/N=0 and the correction is zero. In this example the accumulator carries only two decimal positions, hence the hundredth position in parentheses as shown in FIG. 4 (e.g., (0)98, (1)96, (2)94 ...) is for purposes of explanation and this overflow value is either lost or ignored.

FIG. 5 illustrates how the faster clock Ck2, which drives the conversion logic 316, also will figure in determining the amount of adjustment to be made to compensate for the timing error. The conversion logic 316 has an output 318 that is a stream of 0s and 1s. The bits shift when an overflow occurs and R=0. The conversion logic 316 adds or subtracts 0s or 1s to the stream (as shown in the box) to correct for jitter if R≠0 so that the shift between 0s and 1s illustrated by line 405 occurs at a constant frequency with very little jitter.

The conversion logic 316 can be provided using an MGT on a Virtex FPGA, or similar device with a high speed clock. As a non-limiting example, the 10 gigabit-per-second MGT of a Virtex 4 FPGA from Xilinx Inc. can be driven by a 32-bit parallel word that defines the desired delay in increments of 100 picoseconds, as determined from R/N. Since timing in the MGT is derived from a stable crystal oscillator, the output jitter of a standard accumulator alone will be reduced ideally to +/− 50 picoseconds (ps).

When an MGT or comparable transceiver device is not available, the adjustable delay can be constructed using combinatorial delays available on a programmable logic device, provided they have the desired small granularity. For example, a series of buffers or delay lines can be used, with the number of buffers to which an overflow signal is directed is dependent on the R/N ratio occurring at overflow.

Besides buffers of delay lines, the carry chain in a Virtex 4 FPGA, or other FPGAs, likewise will provide a repetitive structure with an incremental delay of approximately 50 ps that can be concatenated easily. One drawback with such combinational delay devices as opposed to using an MGT is their lack of timing stability and predictability due to temperature and voltage variations as well as by manufacturing tolerances.

In one embodiment of the present invention, to overcome a lack of stability, a calibration can be performed. For example, with a carry chain, a measurement of the number of stages equal to one accumulator clock period can be performed under current temperature and voltage conditions, and then the value can be used to correct the above described calculations to adjust for jitter. Since voltage and temperature might change over time, it is advisable to repeat the calibration at regular intervals. The calibration measurement, however, is not allowed to interfere with the normal operation of the DDS circuit, so it is best to use two carry chains in a ping-pong mode, one being used for calibration while the other is used for jitter correction. Using the above described techniques, a total jitter of well below +/− 100 picoseconds seems to be achievable.

Figure 6:
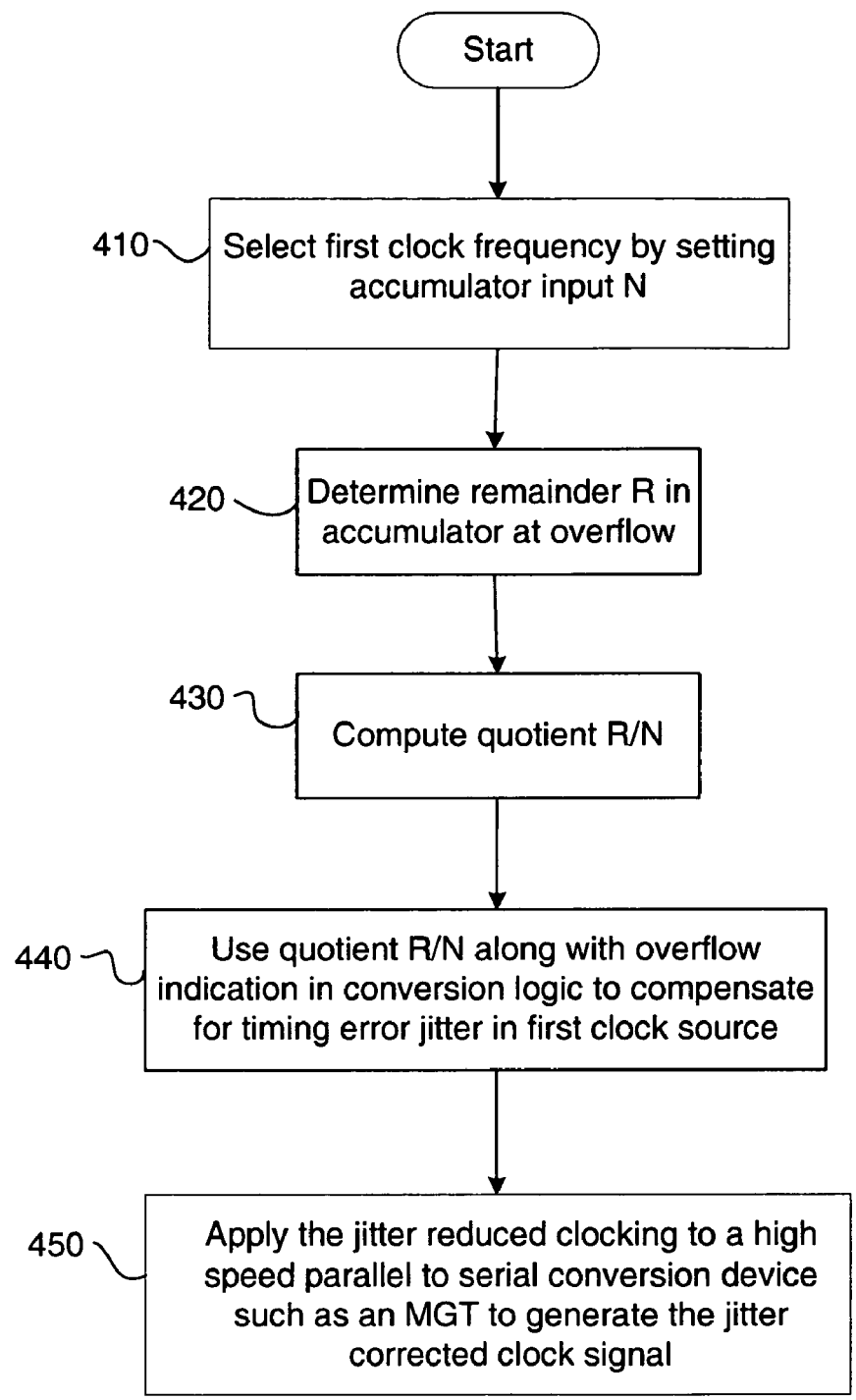
FIG. 6 depicts a flow chart of a method for compensating for clock jitter according to embodiments of the present invention.

FIG. 6 depicts a flow chart of a method 400 of using DDS to provide a clock source with reduced jitter, according to embodiments of the present invention. In a first step 410 in FIG. 6, a first clock frequency is selected for a first clock source by setting an accumulator input N in the accumulator. In a second step 420, a remainder R is determined from the accumulator at the moment of an overflow. In a third step 430, a quotient R/N is computed. This can be done in a multiplier downstream of and functionally connected with the accumulator, wherein the multiplier computes (1/N)*(R) with the value for 1/N being pre-computed.

In a fourth step 440, once the quotient R/N is computed, the quotient R/N is used in conversion logic, driven by a second clock source, to compute an output of the conversion logic. In a fifth step 450, the output of the conversion logic is applied to compensate for a timing error in the first clock source. The compensatory application of the output from the conversion logic serves to delay the output edge of the first clock source.

Although the present invention has been described above with particularity, this was merely to teach one of ordinary skill in the art how to make and use the invention. Many additional modifications will fall within the scope of the invention, as that scope is defined by the following claims.

What is claimed is:

1. An integrated circuit (IC) having components for providing a first programmable output, the IC comprising:
an accumulator circuit that receives a programmable input N and generates an overflow indication and a remainder R left in the accumulator circuit when an overflow indication is made, wherein the accumulator circuit is coupled to receive a first clock signal having a first frequency;
means for computing a quotient (R/N) as the remainder R divided by the programmable input N; and
means for providing an output signal driven by a second clock signal, wherein the output signal is determined from the overflow indication of the accumulator circuit as adjusted by an amount determined using the quotient R/N and, wherein a second frequency of the second clock signal is greater than the first frequency to enable desired delay increments, the means for providing an output signal generates a stream of "0s" and "1s" defining the output signal, wherein the means for providing an output signal adds or subtracts "0s" or "1s" to the stream of "0s" and "1s" to adjust a frequency of the output signal;
wherein the means for providing an output signal comprises a repetitive structure having incremental delay elements;
wherein delay provided by the incremental delay elements of the repetitive structure is calibrated under current temperature and supply voltage conditions during operation of the IC; and
wherein a measurement of the number of incremental delay elements equal to one accumulator clock period can be performed under the current temperature and supply voltage conditions.

2. The IC of claim 1 wherein the means for computing the quotient R/N comprises a multiplier.

3. The IC of claim 2 wherein an inverse of the programmable input N (1/N) is pre-computed and then multiplied by the remainder R in the multiplier.

4. The IC of claim 1 wherein the means for computing the quotient R/N comprises a divider.

5. The IC of claim 1, wherein the means for providing an output signal further comprises:
a means for delaying an output edge caused by the overflow indication.

6. The IC of claim 1, wherein the means for providing an output operates at a higher frequency than the accumulator circuit.

7. The IC of claim 1, wherein the means for providing an output signal further provides a serial to parallel conversion to generate a parallel output signal.

8. The IC of claim 1, wherein the means for providing an output comprises a multi-gigabit transceiver.

9. The IC of claim 1, wherein a calibration of the incremental delay elements of the repetitive structure is periodically performed.

10. The IC of claim 1 wherein the accumulator circuit further comprises:
a register; and
an adder having a first input for receiving the programmable input N and a second input for receiving an output feedback from the register, wherein the register provides a first output indicating the remainder R and a second output indicating the when the overflow occurs.

11. An integrated circuit (IC) having components for providing a programmable frequency output, the IC comprising:
an accumulator comprising an adder and a register, wherein the adder comprises a first input for receiving a programmable input N and a second input for receiving an output from the register, and wherein the register indicates an overflow and provides a remainder R occurring at overflow of the register, wherein the register is clocked using a first clock signal having a first frequency;
a multiplier connected with the accumulator to receive the remainder R at overflow, the multiplier for computing a quotient (R/N) as the remainder R divided by the programmable input N; and
conversion logic receiving the multiplier quotient R/N and a second clock signal having a second frequency which is a higher frequency than the first frequency, wherein the conversion logic provides a jitter-reduced output as adjusted dependent upon the quotient R/N, the conversion logic generating a stream of "0s" and "1s" defining the jitter-reduced output, wherein the conversion logic adds or subtracts "0s" or "1s" to the stream of "0s" and "1s" to adjust a frequency of the jitter-reduced output;

wherein the conversion logic comprises a repetitive structure having incremental delay elements;

wherein delay provided by the incremental delay elements of the repetitive structure are calibrated under current temperature and supply voltage conditions during operation of the IC; and wherein a measurement of the number of incremental delay elements equal to one accumulator clock period can be performed under the current temperature and voltage conditions.

12. The IC as in claim 11 wherein when the remainder R equals zero, the jitter-reduced output will not be affected by the conversion logic output.

13. The IC as in claim 11 wherein the quotient R/N ranges from 0 to 1.

14. The IC of claim 11 wherein when the quotient R/N is not equal to 0, the conversion logic delays an output edge of the first frequency output.

15. A method of providing a programmable frequency source in a device having programmable resources, comprising:

selecting a first programmable frequency for a first programmable frequency source by setting an input N of an accumulator implemented using the programmable resources of the device and selecting a first frequency of a first clock signal;

determining, by the programmable resources of the device, a remainder R from the accumulator at an overflow of the accumulator;

computing a quotient (R/N) as the remainder R divided by the accumulator input N;

driving conversion logic with a second clock signal having a second frequency, wherein the conversion logic comprises a repetitive structure having incremental delay elements;

compensating for a timing error in a frequency of the output signal indicated by overflow of the accumulator using the quotient R/N;

generating a stream of "0s" and "1s" defining the output signal at an output of the conversion logic; and adding or subtracting "0s" or "1s" to the stream of "0s" and "1s" to adjust the frequency of the output signal, wherein delay provided by the incremental delay elements of the repetitive structure are calibrated under current temperature and supply voltage conditions during operation of the IC; and wherein a measurement of the number of incremental delay elements equal to one accumulator clock period can be performed under the current temperature and voltage conditions.

16. The method as in claim 15 wherein the step of computing a quotient (R/N) comprises multiplying R by an inverse of the accumulator input N(1/N).

17. The method as in claim 16 further comprising the step of pre-computing an inverse of the accumulator input N(1/N).

18. The method as in claim 15 wherein the computing step comprises dividing the remainder R by the accumulator input N.

* * * * *